United States Patent
Takahama

[15] 3,653,306
[45] Apr. 4, 1970

[54] WATERPROOF CAMERA ACTUATING MECHANISM

[72] Inventor: Sho Takahama, Takarazukashi, Japan
[73] Assignee: Minolta Camera Co., Ltd., Osaka, Japan
[22] Filed: Mar. 3, 1970
[21] Appl. No.: 16,176

[52] U.S. Cl. ...................................................95/11 W
[51] Int. Cl. ..........................G03b 17/08, G03b 17/38
[58] Field of Search.....................95/11 W, 31 AC, 12.5

[56] References Cited

UNITED STATES PATENTS

| | | | |
|---|---|---|---|
| 2,573,885 | 11/1951 | Whitman et al. | 95/11 W |
| 2,104,094 | 1/1938 | Nerwin | 95/31 AC |
| 2,865,271 | 12/1958 | Klein | 95/11 W |
| 2,930,303 | 3/1960 | Sago | 95/31 AC |

Primary Examiner—John M. Horan
Assistant Examiner—Kenneth C. Hutchison
Attorney—Stanley Wolder

[57] ABSTRACT

An operating mechanism for a waterproof camera includes a rotatable axially movable shaft projecting through a bore in the camera housing and sealed thereto by an O-ring. A shoulder carried by the shaft engages the camera shutter release member and a lever slideably engages the shaft and is rotatable therewith and is linked to the camera film advancing and shutter cocking member so that depression of the shaft actuates the shutter release and rocking of the shaft by an external lever slideably engaging the shaft actuates the film advancing and shutter cocking member.

8 Claims, 2 Drawing Figures

Patented April 4, 1972  3,653,306
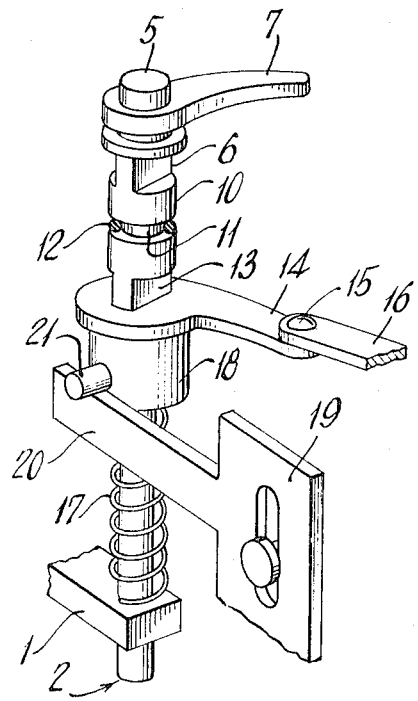
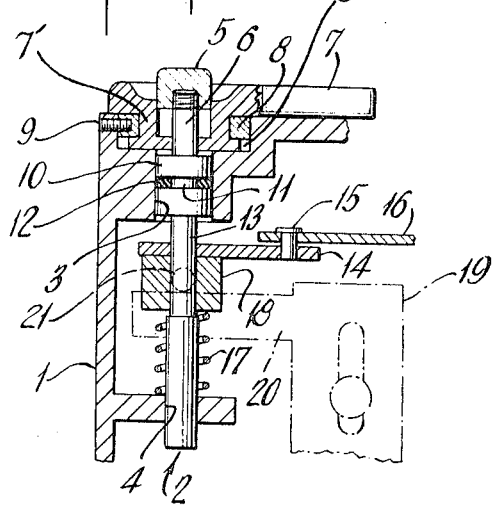
INVENTOR
SHO TAKAHAMA
BY Stanley Wolder
ATTORNEY 3,653,306

WATERPROOF CAMERA ACTUATING MECHANISM

BACKGROUND OF THE INVENTION

The present invention relates generally to improvements in cameras and it relates more particularly to an improved waterproof camera and the actuating mechanism thereof.

In the normal use of the conventional camera the operations which are generally repeatedly required are the actuation of the shutter release and the cocking of the shutter and the advance of the film. These operations are controlled externally of the camera and are preferably effected by independent actuation. In the case of a waterproof camera, however, in order to reduce the possibility of leakage into the camera, the number of moving parts penetrating the camera housing should be at a minimum. Accordingly, in many waterproof cameras the film winding lever also functions as a shutter release actuating lever so that the camera is operated in an unconventional manner and is accompanied by numerous disadvantages among which is the great difficulty encountered in holding the camera stationary during the photographic exposure following the release of the shutter, and the available mechanisms otherwise leave much to be desired.

SUMMARY OF THE INVENTION

It is a principal object of the present invention to provide an improved waterproof camera.

Another object of the present invention is to provide in a waterproof camera an improved shutter release and film advancing and shutter cocking actuating mechanism.

Still another object of the present invention is to provide a waterproof camera an improved multiple function operation actuating mechanism requiring a single waterproof seal or gasket.

A further object of the present invention is to provide an improved mechanism of the above nature characterized by its simplicity, reliability and ease and convenience of use.

The above and other objects of the present invention will become apparent from a reading of the following description taken in conjunction with the accompanying drawing which illustrates a preferred embodiment thereof.

In a sense the present invention contemplates the provision in a waterproof camera comprising a housing having an opening therein, and a shutter release member and a shutter cocking and film advancing member located in the housing, the improvement comprising a shaft in water tight engagement with said opening and rotatable and axially movable between raised and depressed positions, means for actuating said shutter release member in response to the axial movement of said shaft, and means for actuating said shutter cocking and film advancing member in response to the rotation of said shaft.

According to a preferred form of the improved mechanism the housing opening is a vertical cylindrical bore and the shaft includes a cylindrical section slideably and rotatably engaging said bore and having a peripheral groove in which rests an O-ring which engages the face of the bore. Upper and lower sections of the shaft on opposite sides of the O-ring holding cylindrical section are provided with longitudinally extending flats. The upper or outer shaft section is slideably engaged by an external actuating lever rotatable therewith and the inner or lower shaft section is slideably engaged by an internal lever which is rotatable therewith and coupled to the film advancing and shutter cocking member. The outer end of the shaft is provided with a pushbutton and the shaft is spring urged to its raised position and is provided with a shoulder member which bears on the camera shutter release member.

The improved mechanism is superior to those heretofore available. It requires the use of only a single watertight seal and is operated in the manner of conventional cameras in that the shutter release, and the film advance and shutter cocking are effected in the usual manner by depression of a shutter release button and the rocking of a lever respectively to obviate the disadvantages of the conventional shutter release and cocking, and film winding mechanisms in waterproof cameras.

BRIEF DESCRIPTION OF THE DRAWING

FIG. 1 is a fragmentary perspective view of the improved mechanism in accordance with the present invention; and
FIG. 2 is a longitudinal sectional view thereof.

DESCRIPTION OF THE PREFERRED EMBODIMENT

Referring now to the drawing which illustrates a preferred embodiment of the present invention, the reference numeral 1 generally designates the body member or housing of a camera of generally conventional construction which includes a rockable member (not shown) for cocking or charging the camera shutter and simultaneously advancing the film a unit frame, and a shutter release member 19 vertically slideably supported and normally located in a raised position and depressible to effect the shutter release. An integrally formed arm 20 projects laterally from shutter release member 19.

Formed in the top wall of housing 1 proximate a side end thereof is a vertical cylindrical bore or guide opening 3 enlarged at its upper part to provide a coaxial cylindrical top well 3. An inwardly projecting, horizontal bracket is integrally formed with housing 1 and includes a vertical bore 4 coaxial with bore 3. A vertical shaft 2 has a lower cylindrical and rotatably and slideably engaging bore 4 and is provided at its upper part with enlarged coaxial cylindrical section 10 rotatably and slideably engaging bore 3. Formed in cylindrical section 10 is a peripheral groove or channel 11 which holds an O-ring 12 of any suitable material which engages the face of bore 3 and effects a watertight seal between cylindrical section 10 and bore 3 while permitting the axial movement and rotation of shaft 2 and cylindrical section 10.

The top of shaft 2 has opposite parallel flats formed therein to define a top shaft section 6 of noncircular transverse cross section and a section of shaft 2 extending below bore 3 likewise has opposite parallel flats formed therein to define an intermediate shaft section 13 of noncircular transverse cross section.

A hand lever 7 is positioned on the top wall of housing 1 and includes a hub 7' registering with the top wall well 3' and locked against vertical movement therein by an annular member or ring 8 engaging a mating peripheral channel in the lever hub 7' and locked in position by a set screw 9 engaging annulus 8 and housing 1 the ring 8 permitting the rotation of lever 7 while restricting any axial movement thereof. The base of the lever hub has an axial bore mating and engaging shaft section 6 so that hand lever 7 is rotatable with the shaft 2 and permits the relative axial movement thereof. A shutter release pushbutton 5 vertically slideably registers with a coaxial well in the top of the hub of lever 7 and screw engages the top of shaft 2 and projects above the lever hub. Thus the shaft 2 may be rotated by lever 7 and axially depressed by button 5.

A laterally extending lever 14 has an opening proximate an end thereof mating and slideably engaging shaft section 13 whereby lever 14 is rotatable with shaft 2 which is axially movable in the mating opening therein. The free end of lever 14 is connected by a pin 15 to one end of a link 16 the other end of which is connected to the camera shutter cocking and film advancing member so that the rotation of shaft 2 actuates the shutter cocking and film advancing member by way of lever 14 and link 16.

A collar 18 is affixed to shaft 2 below lever 14 by a should member defining set screw or pin 21 which projects radially from collar 18 and abuts the upper face of arm 20. A helical compression spring 17 encircles shaft 2 and is entrapped between the underface of collar 18 and the underlying bracket formed integrally with housing 1 to resiliently urge shaft 2 to its raised position.

In operation of the improved mechanism described above, to cock the shutter and fully advance the film a frame, the lever 7 is turned in the usual manner whereby to rotate lever 14 which in turn, by way of link 16, actuates the camera shutter cocking and film advancing member which is of conventional construction and association. The above shutter cocking and film advancing operation is independent of the shutter release operation. It should be noted that the shutter release member 19 is related to the camera shutter mechanism in the known manner that it cannot be depressed until the completion of an antecedent shutter cocking and film advancing operation.

The shutter release operation is effected by depressing button 5 which lowers shaft 2, collar 18 and pin 21 against the influence of spring 17, the pin 21 bearing on arm 20 to depress arm 20 and shutter release plate 19 whereby to release the shutter. Upon release of the button 5 the shaft 2, button 5 and pin 21 are returned by spring 17 to their raised retracted positions permitting the retraction of shutter release member 19.

The shutter release actuation operation is independent of the shutter cocking and film advancing actuation, both operations being performed in the same manner as in conventional cameras and being alternatively accomplished by the axial movement or rotation of a common shaft 2. Moreover, the mechanical coupling between the external actuating members, shutter release button 5 and cocking and winding lever 7, and the internal camera mechanism is achieved through a single opening in the camera housing by way of a single simple watertight packing arrangement employing the O-ring 12.

While there has been described and illustrated a preferred embodiment of the present invention, it is apparent that numerous alterations, omissions and additions may be made without departing from the spirit thereof.

I claim:

1. In a waterproof camera comprising a housing having an opening therein, and a shutter release member and a shutter cocking and film advancing member located in said housing, the improvement comprising a rotatable and axially movable shaft in watertight engagement with said opening and including an outer section of noncircular transverse cross section, means for actuating said shutter release member in response to the axial movement of said shaft, means for actuating said shutter cocking and film advancing member in response to the rotation of said shaft, a lever located externally of said housing and including a bore mating and slideably engaging said shaft outer section, and means restricting the axial movement of said lever.

2. The watertight camera of claim 1 wherein said shaft and said housing opening have confronting coaxial cylindrical faces, one of said faces having a peripheral groove formed therein, and an O-ring engaging said groove and bearing on the other of said faces.

3. The underwater camera of claim 1 including spring means resiliently urging said shaft outwardly.

4. The waterproof camera of claim 1 wherein said means for actuating said shutter cocking and film advancing member includes a lever slideably engaging said non-circular shaft section and being rotatable therewith.

5. The watertight camera of claim 1 wherein said housing has a cylindrical well formed in its outer face coaxial with and of larger diameter than said opening, said lever having a hub rotatably nesting in said well and having said bore formed therein and a coaxial cylindrical well in the top face thereof, and including a button connected to the upper end of said shaft and slideably engaging said hub well.

6. The watertight camera of claim 1 wherein said housing opening is defined by a cylindrical bore and said shaft includes an enlarged cylindrical section proximate its outer end slideably and rotatably engaging said bore and having a peripheral groove formed therein, and an O-ring engaging said peripheral groove and effecting a watertight seal between said bore and said cylindrical section.

7. In a waterproof camera comprising a housing having an opening therein including a cylindrical bore and a shutter release member and a shutter cocking and film advancing member located in said housing, the improvement comprising a rotatable and axially movable shaft in watertight engagement with said opening, means for actuating said shutter release member in response to the axial movement of said shaft, means for actuating said shutter cocking and film advancing member in response to the rotation of said shaft, said shaft including an enlarged cylindrical section rotatably and slideably engaging said bore and having a peripheral groove formed therein, and non-circular upper and lower shaft sections located on opposite sides of said cylindrical section, an O-ring registering with said groove and engaging the face of said bore, a lever disposed externally of said housing and slideably engaging said shaft upper section and being rotatable therewith, said means for actuating said shutter cocking and film advancing member including a lever slideably engaging said shaft lower section and being rotatable therewith, sand spring means resiliently outwardly urging said shaft.

8. The waterproof camera of claim 7, wherein said film shutter release member is vertically movable and said means for actuating said film release member includes a shoulder member mounted on said shaft and vertically movable therewith and engaging said shutter release member.

* * * * *